(12) United States Patent
Brekke et al.

(10) Patent No.: US 7,511,950 B1
(45) Date of Patent: Mar. 31, 2009

(54) TRIFOLD LAPTOP COMPUTER

(75) Inventors: Bobbi A. Brekke, Austin, TX (US);
Francisco Garcia, Manor, TX (US);
David Nevarez, Austin, TX (US);
Debora Velarde, Beaverton, OR (US);
Marcos A. Villarreal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/931,792

(22) Filed: Oct. 31, 2007

(51) Int. Cl.
*G06F 1/16* (2006.01)
*A47B 81/00* (2006.01)

(52) U.S. Cl. .................... 361/681; 361/683; 312/223.1; 248/917

(58) Field of Classification Search ......... 361/679–686, 361/724–727; 312/223.1, 223.2; 248/917–924; 345/156, 168
See application file for complete search history.

(56) References Cited

U.S. PATENT DOCUMENTS 5,539,615 A * 7/1996 Sellers ........................ 361/680
5,594,619 A * 1/1997 Miyagawa et al. .......... 361/681
6,522,529 B1 * 2/2003 Huilgol et al. .............. 361/681
2002/0141146 A1 * 10/2002 Mustoe ....................... 361/683

* cited by examiner

*Primary Examiner*—Jayprakash N Gandhi
*Assistant Examiner*—Nidhi Desai
(74) *Attorney, Agent, or Firm*—Steven L. Bennett; Dillon & Yudell LLP

(57) ABSTRACT

The present invention provides a computer that includes a processor part having a top side and a bottom side. A keyboard part, having a key side and back side, is pivotally connected to the processor part. The computer of the present invention includes a display part having a screen side and a back side. In some embodiments, the display part is pivotally connected to the processor part. In other embodiments, the display part is pivotally connected keyboard part. The keyboard part is configured to lie against the processor part in a closed position, with the key side of the keyboard part facing away from the top side of the processor part. The display part is configured to lie against and cover the keyboard part in the closed position, with the screen side of the display part facing toward the key side of the keyboard part. The display part is movable from the closed position to a first open position in which the keyboard part remains lying against the processor part with the key side of the keyboard part exposed. The keyboard part and the display part are movable to a second open position in which the display part lies against the processor part and the display part lies against the processor part.

10 Claims, 5 Drawing Sheets

TRIFOLD LAPTOP COMPUTER

BACKGROUND OF THE INVENTION

1. Technical Field

The present invention relates generally to the field of portable computer, such as notebook or laptop computers, and more particularly to a trifold laptop computer that is well suited for use with an external display monitor.

2. Description of the Related Art

Portable computers, such as notebook computer and laptop computers, have become very popular. Laptop computers have provided a very convenient way for computer users to work away from their offices. With the increase in power and memory in laptop computers, many users use their laptop computers as their primary computer rather than using separate desktop computers in their offices.

Many users prefer to use a large desktop monitor when they are working in their offices rather than the smaller display of a laptop computer. Some users use docking stations or port replicators to connect their laptop computer to an external mouse, keyboard, and monitor. However, the docking station or port replicator is an extra piece of equipment and many users would prefer to use their laptop keyboard and point device rather than an extra keyboard and mouse. Users can open their laptops and use that onboard keyboard and pointing device while the laptop computer is connected to a monitor. However, the laptop display obscures their view of the monitor. A user can place the laptop to the side of the monitor, but this results in an uncomfortable and non-ergonomic working position.

SUMMARY OF THE INVENTION

Embodiments of the present invention provide a computer that includes a processor part having a top side and a bottom side. A keyboard part, having a key side and back side, is pivotally connected to the processor part. The computer of the present invention includes a display part having a screen side and a back side. In some embodiments, the display part is pivotally connected to the processor part. In other embodiments, the display part is pivotally connected keyboard part.

The keyboard part is configured to lie against the processor part in a closed position, with the key side of the keyboard part facing away from the top side of the processor part. The display part is configured to lie against and cover the keyboard part in the closed position, with the screen side of the display part facing toward the key side of the keyboard part. The display part is movable from the closed position to a first open position in which the keyboard part remains lying against the processor part with the key side of the keyboard part exposed. The keyboard part and the display part are movable to a second open position in which the display part lies against the processor part and the display part lies against the processor part.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1A:
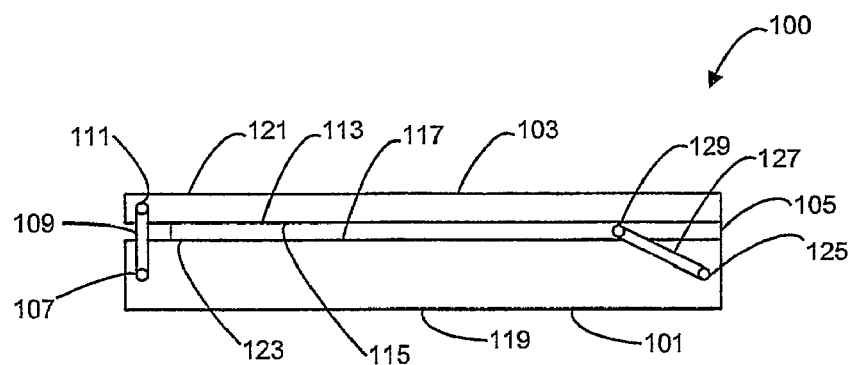
FIG. 1A is a side view of an embodiment of a computer according to the present invention in a closed position.

Referring now to the drawings and first to FIG. 1A, an embodiment of a computer 100 according to the present invention is shown in a closed position. Computer 100 includes a processor part 101, the display part 103, and the keyboard part 105. Computer 100 functions as a laptop or notebook computer. Processor part 101 houses conventional laptop computer equipment such as a power supply, cooling system, motherboard, disk drives, etc., as well as external connectors such as USB connectors, network connectors, external display connectors, and the like. Processor part 101 includes a top side 117 and a bottom side 119. Display part 103 houses conventional laptop computer display equipment, including a display screen. Display part 103 includes a screen side 115 and a back side 121. Keyboard part 105 houses conventional laptop computer keyboard equipment comprising a plurality of keys. Keyboard part 105 includes a key side 113 and a back side 123. As shown in FIG. 1A, in the closed position, back side 123 a keyboard part 105 lies against top side 117 of processor part 101. Screen side 115 of display part 103 covers key side 113 of keyboard part 105.

Figure 1B:
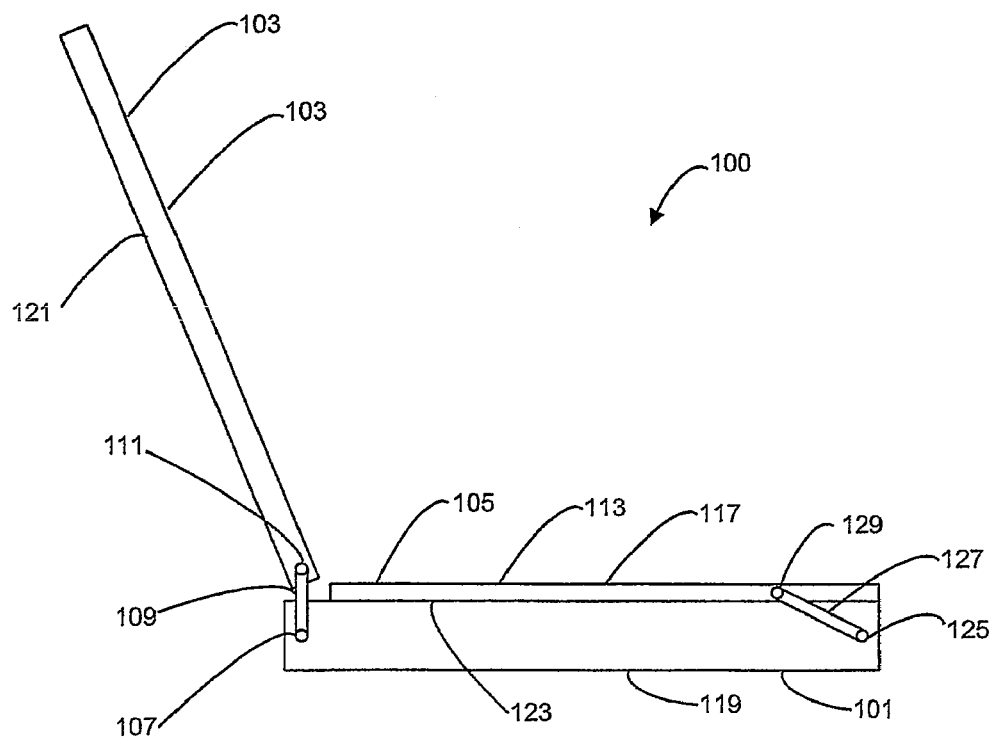
FIG. 1B is a side view of the computer of FIG. 1A in a first open position.

In the embodiment of FIG. 1A, display part 103 is movably connected to processor part 101 by a hinge arrangement comprising a pivot pin 107, which is connected to a link 109, which in turn is connected to a pivot pin 111. A similar hinge arrangement is positioned on the opposite side of computer 100. As shown in FIG. 1B, display part 103 is rotatable on pivot pin 111 to a first open position. In the first open position, key side 113 of keyboard part 105 is exposed. Similarly, screen side 115 of display part 103 is exposed. Accordingly, in the first open position, computer 100 may be used as a conventional laptop computer. Those skilled in the art will recognize that wiring or cabling between processor part 101 and display part 103 may be run through pivot pins 107 and 111 and link 109, or otherwise connected between processor part 101 and display part 103.

Figure 1C:
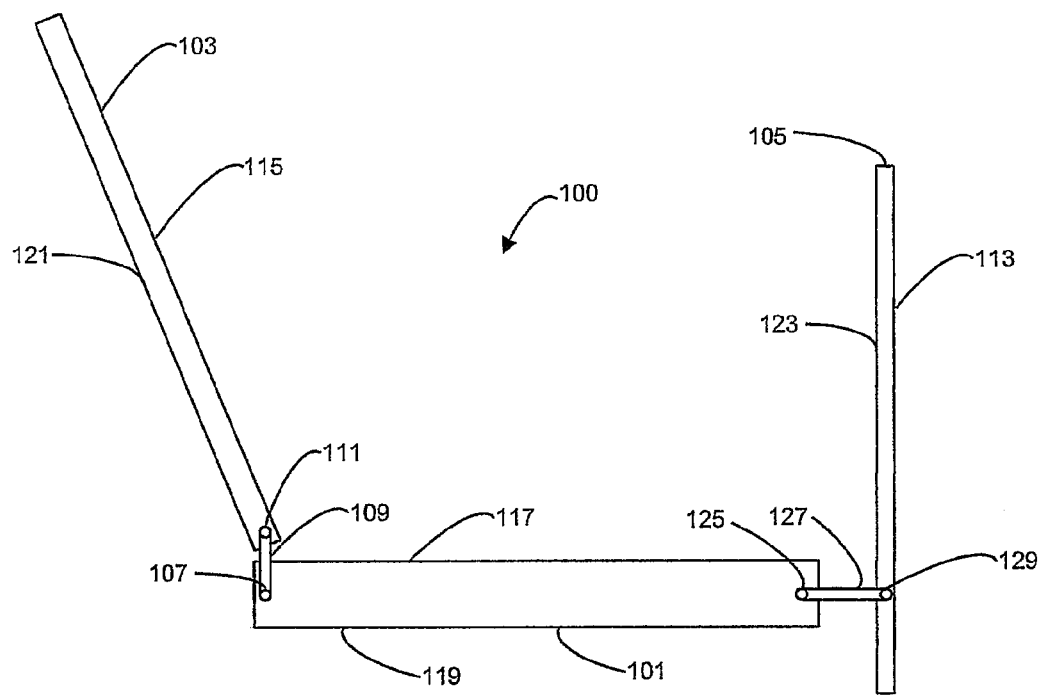
FIG. 1C is a side view of the computer of FIG. 1A in a first intermediate position.
Figure 1D:
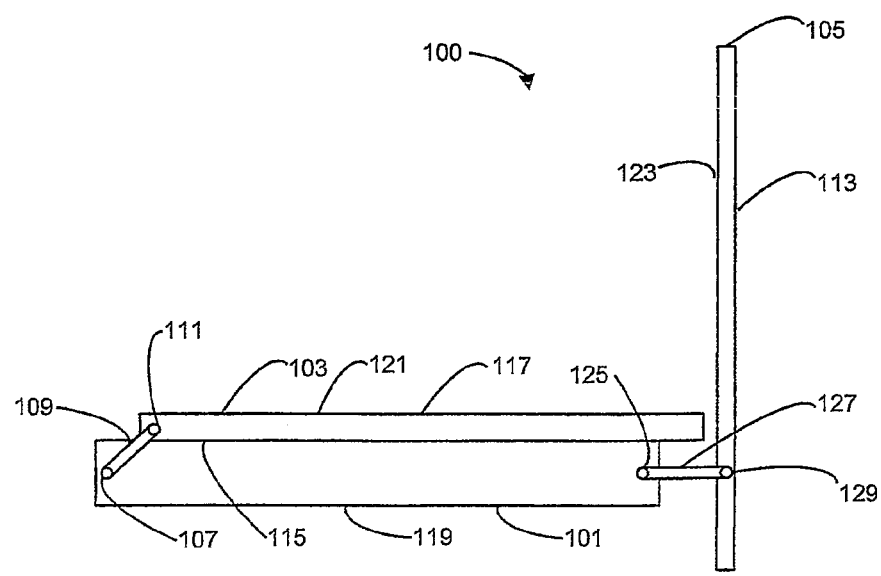
FIG. 1D is a side view of the computer of FIG. 1A in a second intermediate position.
Figure 1E:
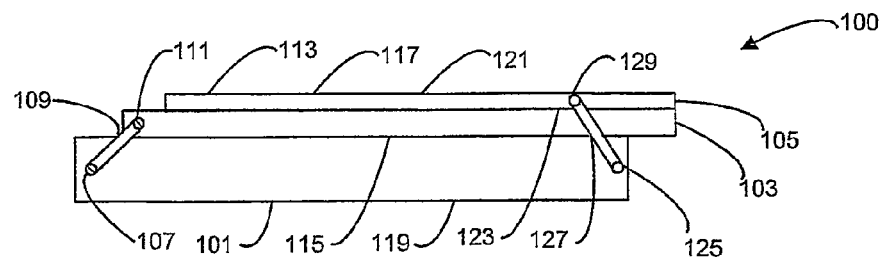
FIG. 1E is a side view of the computer of FIG. 1A in a second open position.

Keyboard part 105 is movably connected to processor part 101 by hinge arrangement comprising a pivot pin 125, which is connected to a link 127, which in turn is connected to a pivot pin 129. A similar hinge arrangement is positioned on the opposite side of computer 100. As shown in FIG. 1C, keyboard part 105 is movable to a first intermediate position in which back side 123 of keyboard part 105 is rotated clear of top side 117 of processor part 101. As shown in FIG. 1D, display part 107 is movable to a second intermediate position in which screen side 115 of display part 105 is rotated into contact with top side 117 of processor part 101. As shown in FIG. 1 E, keyboard part 105 is movable to a second open position in which back side 123 of keyboard part 105 is rotated into contact with back side 121 of display part 103. Thus, in the second open position of FIG. 1E, key side 113 of keyboard part 105 is exposed while display part 103 is closed against processor part 101. In the second open position, processor part 101 may be connected to an external monitor (not shown) so that keyboard part 105 may be used as a keyboard and display part 103 is not visible.

Figure 2A:
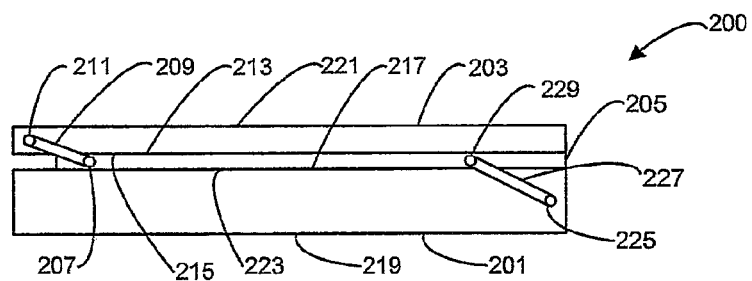
FIG. 2A is a side view of an alternative embodiment of a computer according to the present invention in a closed position.

Referring now to FIG. 2A, an alternative embodiment of a computer 200 according to the present invention is shown in a closed position. Computer 200 includes a processor part 201, the display part 203, and the keyboard part 205. Computer 200 functions as a laptop or notebook computer in the same way as computer 100, described above. Processor part 201 includes a top side 217 and a bottom side 219. Display part 203 includes a screen side 215 and a back side 221. Keyboard part 205 includes a key side 213 and a back side 223. As shown in FIG. 2A, in the closed position, back side 223 a keyboard part 205 lies against top side 217 of processor part 201. Screen side 215 of display part 203 covers key side 213 of keyboard part 205.

Figure 2B:
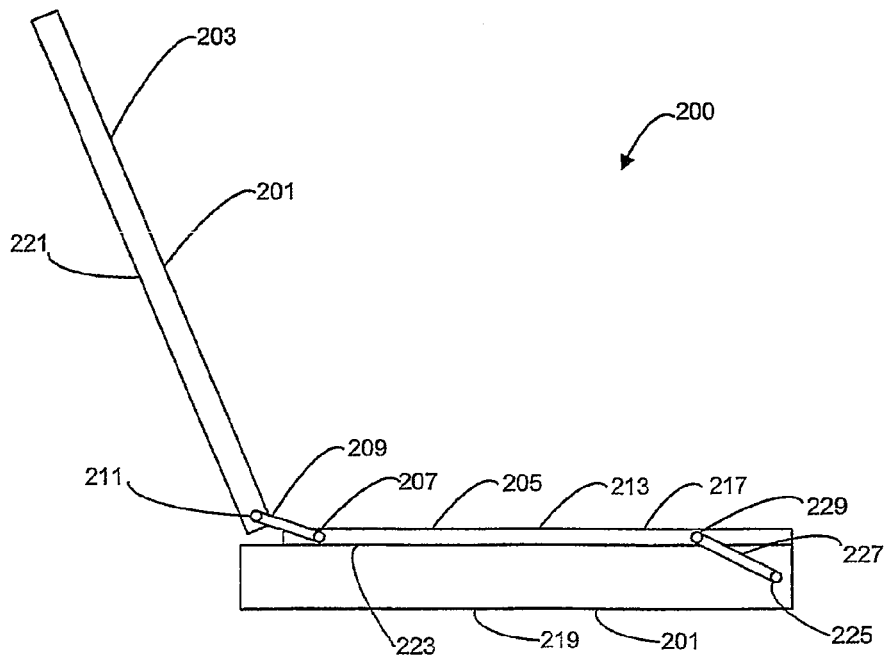
FIG. 2B is a side view of the computer of FIG. 2A in a first open position.

In the embodiment of FIG. 2A, display part 203 is movably connected to keyboard part 205 by a hinge arrangement comprising a pivot pin 207, which is connected to a link 209, which in turn is connected to a pivot pin 211. A similar hinge arrangement is positioned on the opposite side of computer 200. As shown in FIG. 2B, display part 203 is rotatable on pivot pins 207 and 211 to a first open position. In the first open position, key side 213 of keyboard part 205 is exposed. Similarly, screen side 215 of display part 203 is exposed. Accordingly, in the first open position, computer 200 may be used as a conventional laptop computer.

Figure 2C:
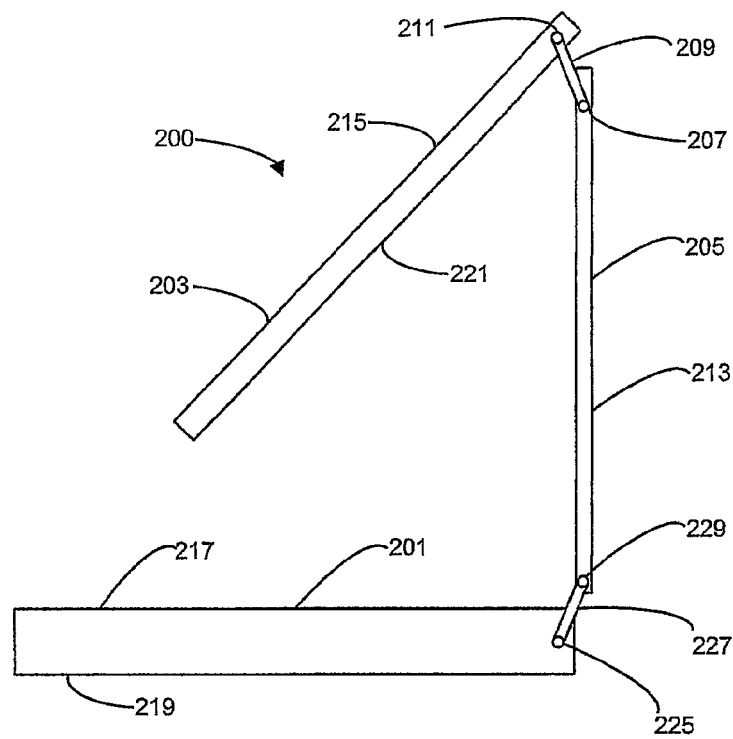
FIG. 2C is a side view of the computer of FIG. 2A in a first intermediate position.
Figure 2D:
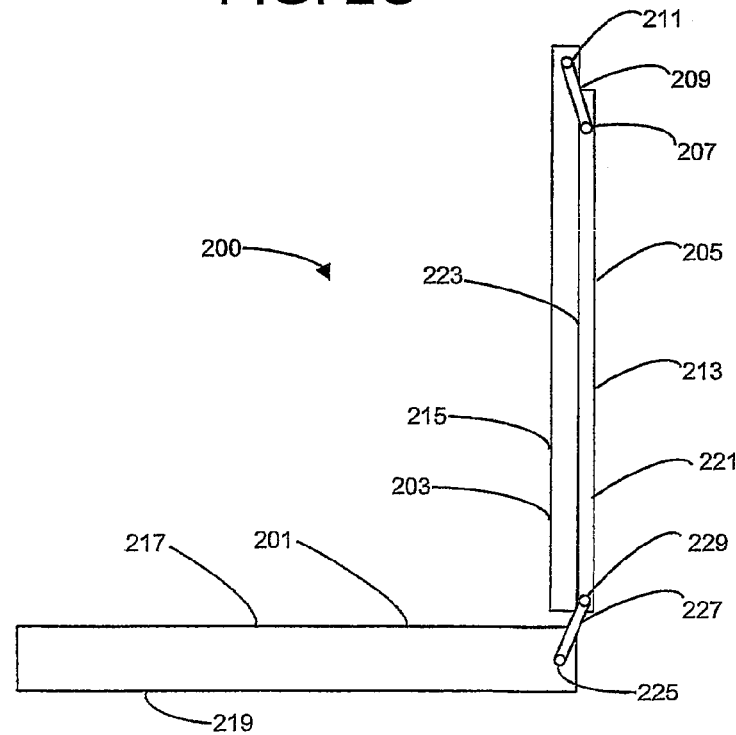
FIG. 2D is a side view of the computer of FIG. 2A in a second intermediate position; and, FIG. 2E is a side view of the computer of FIG. 2A in a second open position.
Figure 2E:
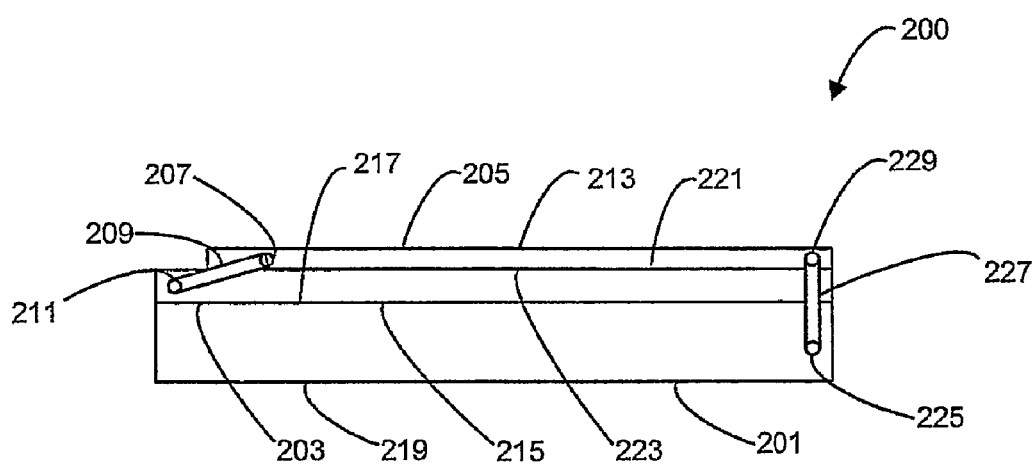

Keyboard part 205 is movably connected to processor part 201 by hinge arrangement comprising a pivot pin 225, which is connected to a link 227, which in turn is connected to a pivot pin 229. A similar hinge arrangement is positioned on the opposite side of computer 200. As shown in FIG. 2C, keyboard part 205 is movable to a first intermediate position in which back side 223 of keyboard part 205 is rotated clear of top side 217 of processor part 201. In the first intermediate position, display part 203 is rotated over keyboard part 205 so that back side 221 of display part 207 faces back side 223 of keyboard part 205. As shown in FIG. 2D, display part 207 is further movable to a second intermediate position in which back side 223 of display part 203 is rotated into contact with back side 223 of keyboard part 205. As shown in FIG. 2E, keyboard part 105 and display part 203 are movable together to a second open position in which screen side 213 of display part 203 is rotated into contact with top side 217 of processor part 201. Thus, in the second open position of FIG. 2E, key side 213 of keyboard part 205 is exposed while display part 203 is closed against processor part 201. In the second open position, processor part 201 may be connected to an external monitor (not shown) so that keyboard part 205 may be used as a keyboard and display part 203 is not visible.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A computer, which comprises:
   a processor part, said processor part including a top side and a bottom side;
   a keyboard part pivotally connected to said processor part, said keyboard part including a key side and back side, said keyboard part being configured to lie against said processor part in a closed position with said back side of said of said keyboard part in contact with the top side of said processor part; and,
   a display part pivotally connected to one of said processor part or said keyboard part, said display part including a screen side and a back side, said display part being configured to lie against and cover said keyboard part in said closed position with said screen side of said screen part facing toward said key side of said keyboard part;
   said display part being movable from said closed position to a first open position wherein said display part is pivoted away from said processor part to expose said screen side of said display part and to expose said key side of said keyboard, with said back side of said keyboard part in contact with said top said of said processor part; and,
   said display part and said keyboard part being movable from said first open position to a second open position wherein said display part is pivoted to lie against said top side of said processor part with said screen side facing said top side of said processor part, and said keyboard part is pivoted to lie against said display part with said back side of said keyboard part in contact with said back side of said display part.

2. The computer as claimed in claim 1, wherein said display part is pivotally connected to said processor part.

3. The computer as claimed in claim 1, wherein said display part is pivotally connected to said keyboard part.

4. A computer, which comprises:
   a processor part, said processor part including a top side and a bottom side;
   a keyboard part movably positioned with respect to said processor part, said keyboard part including a key side and back side, said keyboard part being configured to lie against said processor part with said back side of said keyboard part at least partially in contact with said top side of processor part in a closed position; and,
   a display part movably positioned with respect to said processor part and said keyboard part, said display part including a screen side and a back side, said display part being configured to cover said keyboard part with said screen side facing said key side in said closed position;
   said display part and said keyboard part being movable to an open position wherein said display part lies against said processor part with said screen side of display part facing said top side of said processor part, and wherein said keyboard part lies against said display part with said back side of said keyboard part in contact with said back side of said display part;
   said keyboard part and said display part being movable to a further open position wherein said display part is pivoted away from said processor part to expose said screen side of said display part and to expose said key side of said keyboard, with said back side of said keyboard part in contact with said top side of said processor part.

5. The computer as claimed in claim 4, wherein said keyboard part is pivotally connected to said processor part.

6. The computer as claimed in claim 5, wherein said display part is pivotally connected to said processor part.

7. The computer as claimed in claim 5, wherein said display part is pivotally connected to said keyboard part.

8. A computer, which comprises:

a processor part, said processor part including a top side and a bottom side;

a keyboard part pivotally connected to said processor part, said keyboard part including a key side and back side; and, a display part pivotally connected to one of said processor part or said keyboard part, said display part including a screen side and a back side;

wherein said processor part, said keyboard part, and said display part are configured to be in a closed position wherein said keyboard part is on top of said processor part with said back side of said keyboard part in contact with said top side of said processor part, and wherein said display part is on top of said processor part and said keyboard part with said screen side of said display part facing said key side of said keyboard part;

wherein said processor part, said keyboard part, and said display part are further configured to be in a first open position wherein said display part is pivoted away from said processor part and said keyboard part, and wherein said keyboard part is on top of said processor part with said back side of said keyboard part in contact with said top side of said processor part; and, wherein said processor part, said keyboard part, and said display part are further configured to be in a second open position wherein said display part is on top of and in contact with top side of said processor part with said screen said of said display part facing toward said top side of said processor part, and wherein said keyboard part is on top of said display part and said processor part with said back side of said keyboard part in contact with said back side of said display part.

9. The computer as claimed in claim 8, wherein said display part is pivotally connected to said processor part.

10. The computer as claimed in claim 8, wherein said display part is pivotally connected to said keyboard part.

* * * * *